(12) United States Patent
Park et al.

(10) Patent No.: US 7,633,578 B2
(45) Date of Patent: Dec. 15, 2009

(54) BACKLIGHT ASSEMBLY COMPRISING LAMPS HAVING BENT EXTERNAL ELECTRODES, LIQUID CRYSTAL DISPLAY HAVING THE SAME, AND SYSTEM HAVING THE SAME

(75) Inventors: Jong Dae Park, Gumi-si (KR); Cheong Hwa Jeong, Gumi-si (KR)

(73) Assignee: LG. Display Co., Ltd., Seoul (KR)

( * ) Notice: Subject to any disclaimer, the term of this patent is extended or adjusted under 35 U.S.C. 154(b) by 365 days.

(21) Appl. No.: 11/157,026

(22) Filed: Jun. 20, 2005

(65) Prior Publication Data

US 2006/0050202 A1 Mar. 9, 2006

(30) Foreign Application Priority Data

Sep. 7, 2004 (KR) .................. 10-2004-0071145

(51) Int. Cl.
G02F 1/1335 (2006.01)
F21S 4/00 (2006.01)

(52) U.S. Cl. ................. 349/70; 349/61; 349/64; 362/225

(58) Field of Classification Search ............ 349/58, 349/64, 65, 61, 70–71; 362/217, 97, 97.1, 362/97.2, 225
See application file for complete search history.

(56) References Cited

U.S. PATENT DOCUMENTS

| 2002/0021564 A1* | 2/2002 | Cho et al. ............ 362/97 |
| 2002/0149713 A1* | 10/2002 | Ishida et al. ............ 349/58 |
| 2003/0112626 A1 | 6/2003 | Yoo et al. |
| 2004/0156183 A1 | 8/2004 | Kim |
| 2005/0063170 A1* | 3/2005 | Lee et al. ............ 362/31 |

FOREIGN PATENT DOCUMENTS

| JP | 6-313884 | 11/1994 |
| JP | 08-0082796 | 3/1996 |
| JP | 11-095038 | 4/1999 |
| JP | 2003-021834 | 1/2003 |
| WO | WO 01/79922 | 10/2001 |

OTHER PUBLICATIONS

Combined search and examination report dated Feb. 22, 2006 for corresponding French Application No. 0506569000.
First Office Action for corresponding Chinese Patent Application Serial No. 2005100802696, dated Oct. 12, 2007.

* cited by examiner

*Primary Examiner*—Andrew Schechter
*Assistant Examiner*—Charles Chang
(74) *Attorney, Agent, or Firm*—Brinks Hofer Gilson & Lione (57) ABSTRACT

A backlight assembly and the liquid crystal display having the same are provided. The backlight assembly includes: a plurality of lamps spaced apart from one another and each having external electrodes bent at both sides; an electrode plate having an electrode fixing part and a support part supporting the electrode fixing part, which are bent to be connected with the bent external electrode of the lamp; upper and lower structures for fixing the electrode plate; and a diffuser unit for diffusing light generated from the lamp.

20 Claims, 7 Drawing Sheets

BACKLIGHT ASSEMBLY COMPRISING LAMPS HAVING BENT EXTERNAL ELECTRODES, LIQUID CRYSTAL DISPLAY HAVING THE SAME, AND SYSTEM HAVING THE SAME

PRIORITY CLAIM

This application claims the benefit of Korean Patent Application No. 2004-71145 filed in Korea on Sep. 7, 2004, which is hereby incorporated by reference.

FIELD OF THE INVENTION

The present invention relates to a backlight assembly, and more particularly, to a backlight assembly for realizing a liquid crystal display with a slim design, that is lightweight, and with increased simplicity by modifying an external electrode structure of a lamp and an electrode plate structure connected with the external electrode structure.

DESCRIPTION OF THE RELATED ART

In general, among display devices, a cathode ray tube (CRT) is the most popular technology for a monitor of a television set (TV), a measurement instrument, an information terminal instrument and the like, but does not lend itself toward the trend of increased miniaturization and the decreased weight of electronics due to CRT's inherent weight and size.

Accordingly, in the trend of miniaturization and decreased weight of various electronics, the CRT has an inherent limitation in both weight and size. The CRT is expected to be substituted with a liquid crystal display (LCD) using an electro-optic effect, a plasma display panel (PDP) using gas discharge, and an electro luminescence display (ELD) using an electro-luminescence effect. Among them, the LCD is being actively developed.

Specifically, the LCD is used not only for the monitor of a laptop computer, but also for the monitor of a desktop computer and for a large-sized information display device.

Most of the LCDs are light receiving devices for controlling an amount of external light to display an image. Therefore, the LCDs essentially require a separate light source, that is, a backlight for irradiating light to the LCD panel.

In general, the backlight serves as the light source of the LCD, has a cylindrical light-emitting lamp, and is classified as either an edge type backlight or a direct type backlight.

In the edge type backlight, a lamp unit is installed at the lateral surface of a light guide plate for guiding the light. The lamp unit includes a lamp for radiating light; a lamp holder inserted at both ends of the lamp, which protects the lamp; and a lamp reflective plate surrounding the lamp and fitted into the lateral surface of the light guide plate to reflect light radiated from the lamp, toward the light guide plate.

The above-described edge type backlight is mainly applied to smaller sized LCDs such as the monitors of either a laptop computer or a desktop computer, and is advantageous for good uniformity of light, a long durable lifetime, and the slimness of the LCD.

The direct type backlight is being actively developed as the LCD is being used in larger applications with a size of more than 20 inches. In the direct type backlight, a plurality of lamps is arranged in a row on a bottom surface of a diffuser plate to directly irradiate the light to the front surface of the LCD panel.

Since the direct type backlight has an efficiency of light larger than the edge type backlight, it is primarily used for a large screen LCD requiring a high luminance.

The direct type LCD is employed for large-sized monitors or televisions, and thereby requires a longer use time and the use of more lamps than is needed for the laptop computer. Therefore, the direct type LCD has a higher possibility of failing to light the lamp due to the decreased lifetime of the lamp from longer use time and from the use of more lamps.

In the edge type backlight where the lamp unit is installed at both lateral surfaces of the light guide plate, when for example, one lamp is not lighted due to its lifetime expiring or other failure of the lamp, there is not a significant loss of performance except for a reduction of the luminance of an image.

However, in the direct type backlight, a plurality of the lamps is installed at the bottom of the screen. Accordingly, when one lamp is not lighted due to its lifetime expiring or other failure of the lamp, the non-lit portion gets noticeably darker than the lit portions and appears on the screen instantly.

Therefore, since the direct type LCD often replaces the lamps with new ones, it is necessary to have a structure for facilitating the disassembly and reassembly of the lamp.

Hereinafter, a conventional direct type liquid crystal display will be described with reference to the drawings.

Figure 1:
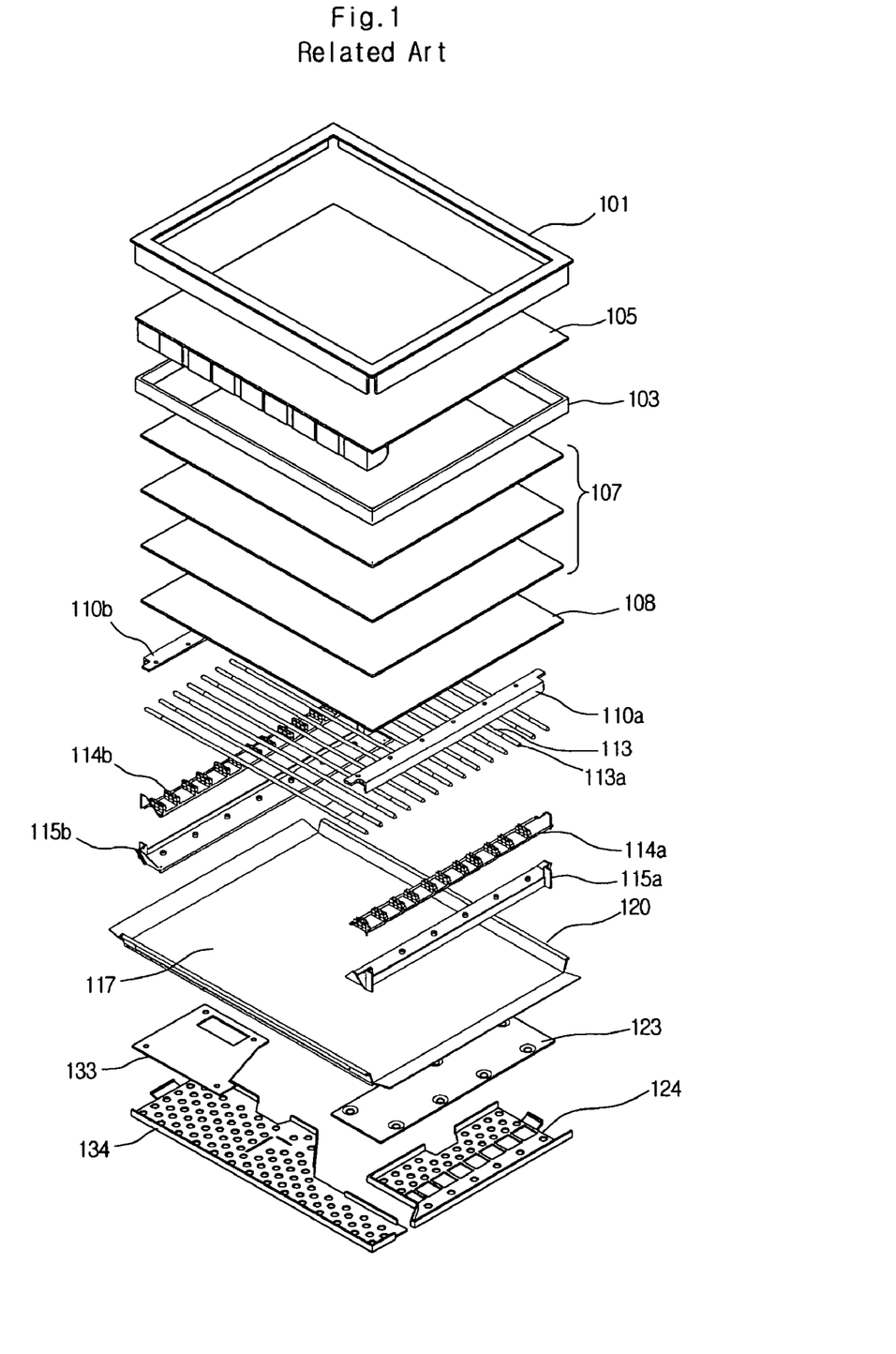
FIG. 1 is a disassembled perspective view illustrating a conventional direct type liquid crystal display as in the related art.

FIG. 1 is a disassembled perspective view illustrating the conventional direct type liquid crystal display.

As shown in FIG. 1, the direct type liquid crystal display includes: a liquid crystal panel assembly 105 having a lower substrate with a thin film transistor (TFT) and a pixel electrode installed thereon; an upper substrate having a color filter layer and adhered to the lower substrate; a source printed circuit board (PCB) and a gate PCB attached to the source PCB; a guide panel 103 for fixing the liquid crystal panel assembly 105; and a top cover 101 and a bottom cover 120 respectively assembled with upper and lower sides of the guide panel 103.

The backlight assembly is located between the bottom cover 120 and the liquid crystal panel assembly 105.

The backlight assembly includes: a plurality of lamps 113; an optic sheet 107; a diffuser plate 108; first and second electrode plates 114a and 114b connected with and supplying power to the plurality of lamps; and first and second upper structures 110a and 110b and first and second lower structures 115a and 115b for fixing the first and second electrode plates 114a and 114b.

The lamps 113, which serve as the light source are spaced apart from one another and arranged in a row, with external electrodes 113a at both ends. The external electrodes 113a are connected with and receive power from the first and second electrode plates 114a and 114b.

The power is applied to the first and second electrode plates 114a and 114b through a wire from an inverter 123 located outside of the bottom cover 120. The inverter can turn the lamps 113 on or off.

A reflective film 117 is coated on an internal surface of the bottom cover 120 to allow light emitted from the lamps 113 to travel toward the liquid crystal panel assembly 105.

The emitted light travels toward the liquid crystal panel assembly 105 fixed to the guide panel 103, and is used as the light source for displaying an image.

Though illustrated in the drawings, non-described reference numerals 133, 134 and 124 respectively denote a control PCB, a PCB cover shield for shielding the control PCB from an external electric field, and an inverter cover shield for shielding the inverter 123 from the external electric field.

Figure 2:
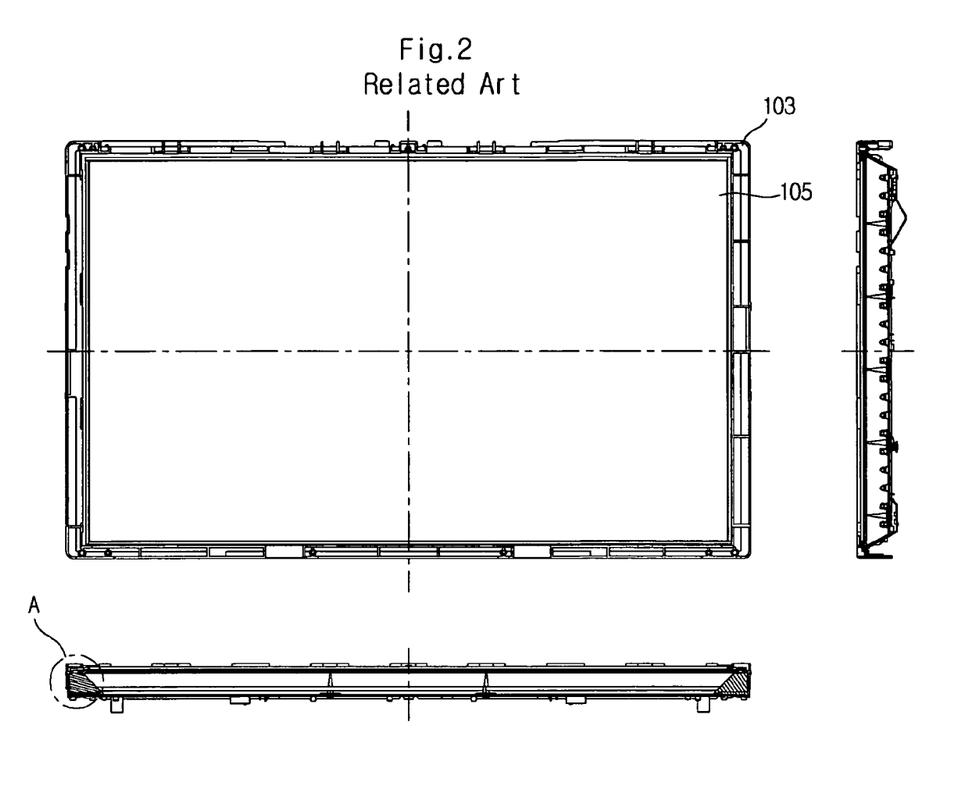
FIG. 2 is assembled plan view and sectional view illustrating a conventional direct type liquid crystal display as in the related art.

FIG. 2 is an assembled plan view and sectional view illustrating a conventional direct type liquid crystal display.

As shown in FIG. 2, in the direct type liquid crystal display, the guide panel 103 is assembled with the bottom cover 120 while fixing the liquid crystal panel assembly 105.

Since the guide panel 103 is opened at its central region, the liquid crystal panel assembly 105 is exposed at its active region to the exterior.

The plurality of lamps 113 are spaced apart from one another between the liquid crystal panel assembly 105 and the bottom cover 120.

The lamps 113 employ either an external electrode fluorescent lamp (EEFL) having an external electrode, or a cold cathode fluorescent lamp (CCFL).

Figure 3:
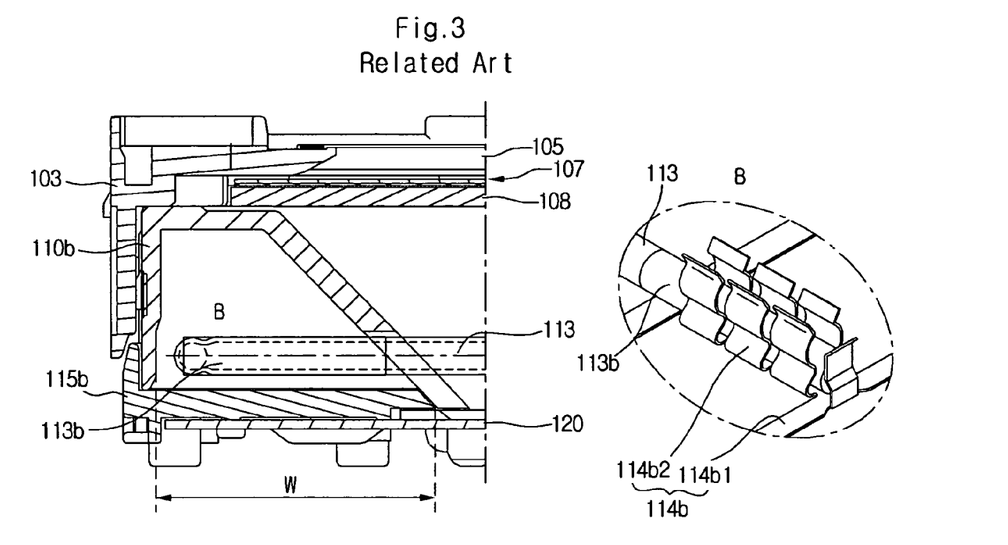
FIG. 3 is an enlarged sectional view illustrating an "A" region of FIG. 2 as in the related art.

FIG. 3 is an enlarged sectional view illustrating the region "A" of FIG. 2.

As shown in FIG. 3, the guide panel 103 fixes the liquid crystal panel assembly 105 while assembled with the bottom cover 120. The diffuser plate 108 and the optic sheets 107 are located between the bottom cover 120 and the liquid crystal panel assembly 105.

The second lower structure 115$b$ is positioned between both the side and edge regions and the internal surface of the bottom cover 120, and the second electrode plate 114$b$ is located on the second lower structure 115$b$.

The second external electrode 113$b$ of the EEFL 113 is connected to the second electrode plate 114$b$.

Though not in detail illustrated in the drawings, the plurality of EEFLs 113 are spaced apart from one another on the second electrode plate 114$b$.

In an enlarged view illustrating the region "B" where the second external electrode 113$b$ of the EEFL 113 is connected with, and on the second electrode plate 114$b$. The second electrode plate 114$b$ includes an electrode fixing part 114$b$2 for fixing the second external electrode 113$b$ of the EEFL 113; and a support part 114$b$1 for supporting the electrode fixing part 114$b$2.

As such, the second electrode plate 114$b$ is connected to the EEFL 113 in a position where it is also connected with the second lower structure 115$b$. The upper structure 110$b$ is connected with the external electrode 113$b$ of the EEFL 113.

The non-described symbol "W" denotes a width of the upper structure 110$b$ and a non-luminous region being an external electrode 113$b$ region of the EEFL 113.

The conventional liquid crystal display has a disadvantage in that due to an increase of size, the EEFL increases in length, and the external electrode increases in length for a higher voltage, thereby causing the extension of the non-luminous region.

As described above, after the EEFL is connected to the electrode plate, it is assembled with and protected by the upper and lower structures. As the external electrode of the EEFL is increased in length, the upper structure is also increased in size. Therefore, the conventional liquid crystal display has a limitation of its slimness.

Further, the above limitation causes the increase of a width of a bezel connected to prevent the leakage of light and accordingly, the conventional liquid crystal display has a drawback in that it is difficult to realize a narrow bezel type.

SUMMARY OF THE INVENTION

The present invention is directed to a backlight assembly and a liquid crystal display using the same that substantially obviates one or more problems due to limitations and disadvantages of the above described related art.

An object of the present invention is to provide a backlight assembly for reducing the width of a non-luminous region and reducing the width of a bezel by modifying the external electrode structure of an External Electrode Fluorescent Lamp (EEFL) and the electrode plate structure connected with the external electrode structure, and the corresponding liquid crystal display.

Additional advantages, objects, and features of the invention will be set forth in part in the description which follows and in part will become apparent to those having ordinary skill in the art upon examination of the following or may be learned from practice of the invention. The objectives and other advantages of the invention that may be realized and attained by the structure are particularly pointed out in the description and the appended drawings. The claims particularly point out and distinctly claim the subject matter of the invention.

To achieve these objects and other advantages and in accordance with the purpose of the invention, as embodied and described herein, there is provided a backlight assembly including: a plurality of lamps spaced apart from one another, each having external electrodes bent at both sides; an electrode plate having an electrode fixing part bent to be connected with the bent external electrode of the lamp and a support part supporting the electrode fixing part; upper and lower structures for fixing the electrode plate; and a diffuser unit for diffusing light generated from the lamp.

In another aspect of the present invention, there is provided a liquid crystal display including: a liquid crystal panel having a color filter substrate and an array substrate attached to one another, and having a liquid crystal layer interposed therebetween; a plurality of lamps spaced apart from one another to supply a light source to the liquid crystal panel, and each having external electrodes bent at both sides; an electrode plate having an electrode fixing part bent to be connected with the bent external electrode of the lamp and a support part supporting the electrode fixing part; upper and lower structures for fixing the electrode plate; and a diffuser unit for diffusing light generated from the lamp.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings are included to provide a further understanding of the invention. The drawings are incorporated in and constitute a part of this application, illustrate embodiment(s) of the invention and together with the description serve to provide further explanation of the invention as claimed. In the drawings:

DETAILED DESCRIPTION OF THE INVENTION

Reference will now be made in detail to the preferred embodiments of the present invention, examples of which are illustrated in the accompanying drawings, and specifically in FIGS. 4A-5B. Wherever possible, the same reference numbers will be used throughout the drawings to refer to the same or like parts.

Figure 4A:
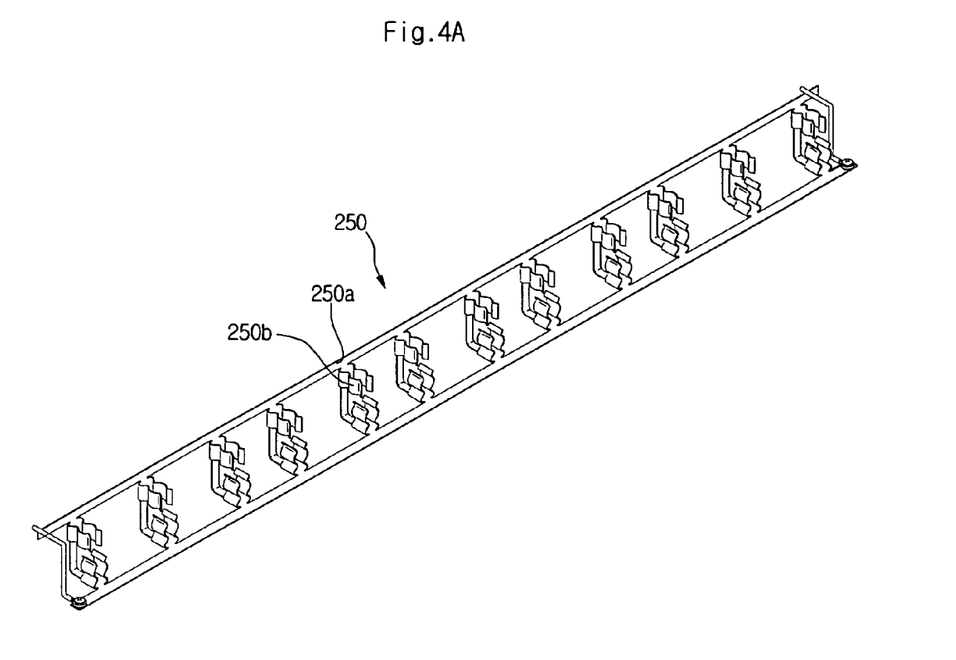
FIG. 4A is a view illustrating an electrode plate structure for connecting a lamp according to an embodiment of the present invention.

FIG. 4A is a view illustrating an electrode plate structure for connecting a lamp according to an embodiment of the present invention.

As shown in FIG. 4A, an electrode plate 250 includes a plurality of electrode fixing parts 250b connected with an external electrode of an external electrode fluorescent lamp (EEFL), and a support part 250a for supporting the plurality of electrode fixing parts 250b. The electrode plate 250 is connected with and supplies power to the external electrode of the EEFL.

Since the electrode plate 250 is connected with and receives power from an inverter and a wire, the electrode plate 250 is made from a conductive metal plate.

The electrode plate 250 is mounted within a bottom cover of a direct type liquid crystal display using the EEFL, and is connected with the EEFL to turn on/off the EEFL using power applied from the inverter.

The electrode plate 250 is manufactured through a press process of cutting, punching, bending, and seamlessly drawing a thin conductive metal plate.

The inventive electrode plate 250 is cut and punched to provide the support part 250a and the electrode fixing part 250b, and is bent vertically at the electrode fixing part 250b to create a bent structure.

Since the inventive electrode plate 250 is vertically bent at the electrode fixing part 250b, it has half or less of the horizontal width than the conventional art.

In detail, the electrode plate 250 is bent vertically with a horizontal surface on which the EEFLs are spaced apart from one another and connected to the electrode plate 250.

As shown in FIG. 4A, the electrode fixing parts 250b are spaced apart from one another along the support part 250a, and fixed to the support part 250a.

Specifically, in the support part 250a, two bar type structures are positioned to be in parallel with each other, and slits are spaced apart from one another with the electrode fixing part 250b between the bar type structures.

The electrode fixing parts 250b are positioned such that one or more electrode fixing parts 250b are located on the slits between two bar type structures.

Since the support part 250a is vertically bent, the electrode fixing parts 250b are vertically disposed.

Figure 4B:
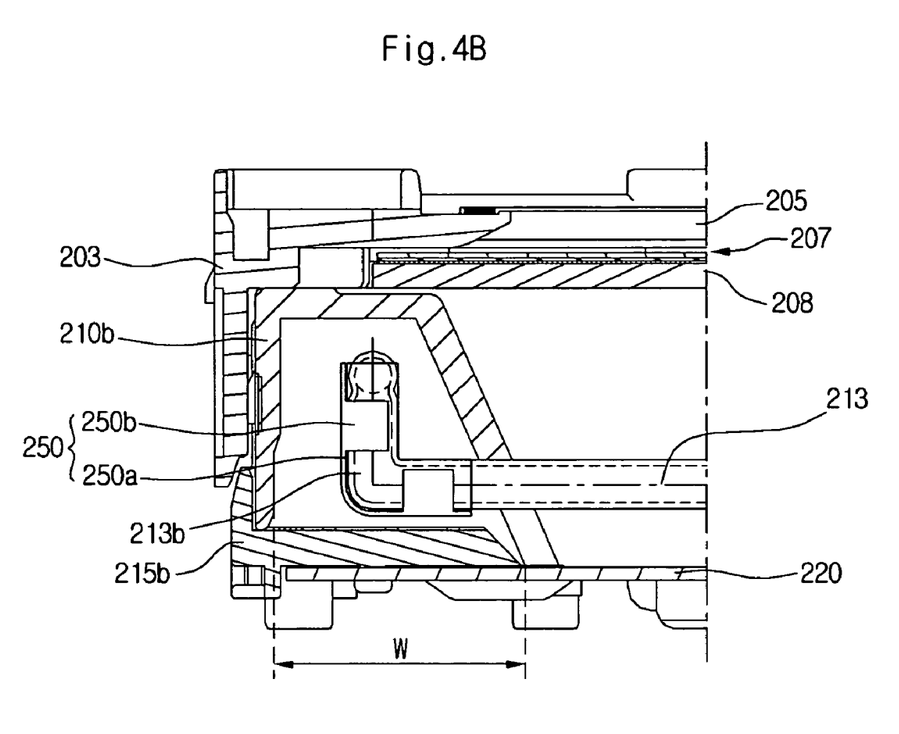
FIG. 4B is an assembled sectional view illustrating a liquid crystal display having an electrode plate according to an embodiment of the present invention.

FIG. 4B is an assembled sectional view illustrating the liquid crystal display having the electrode plate according to one embodiment of the present invention.

As shown in FIG. 4B, a guide panel 203 fixing a liquid crystal panel assembly 205 is positioned opposite a bottom cover 220. A diffuser plate 208 and optic sheets 207 are located between the bottom cover 220 and the liquid crystal panel assembly 205.

A lower structure 215b is located at an internal and edge region of the bottom cover 220, and the electrode plate 250 having a vertically bent structure is located on the lower structure 215b.

In detail, a plurality of EEFLs 213 is spaced apart from one another and is connected to the electrode plate 250. The electrode plate 250 is bent vertically to a horizontal surface on which the EEFLs 213 are spaced apart from one another.

An external electrode 213b of the EEFL 213 is vertically bent at its edge region correspondingly to the bent electrode plate 250.

The bent external electrode 213b of the EEFL 213 is connected to the electrode fixing part 250b of the bent electrode plate 250.

In a structure where the bent external electrode 213b is connected with and on the electrode plate 250, a vertically bent portion of the external electrode 213b is connected with the electrode fixing part 250b provided at a vertical region of the electrode plate 250.

A remaining non-bent portion of the bent external electrode 213b is connected with the electrode fixing part 250b provided at a horizontal region of the electrode plate 250.

In the present invention, the external electrode 213b and the electrode plate 250 are bent, thereby reducing the width (W) of the non-luminous region.

If the external electrode 213b and the electrode plate 250 are narrowed in width, the lower structure 215b and the upper structure 210b can be also reduced in width.

As described above, if the non-luminous region is narrowed, the width of a bezel region is narrowed in assembling the liquid crystal display, thereby providing a narrow bezel type.

Figure 5A:
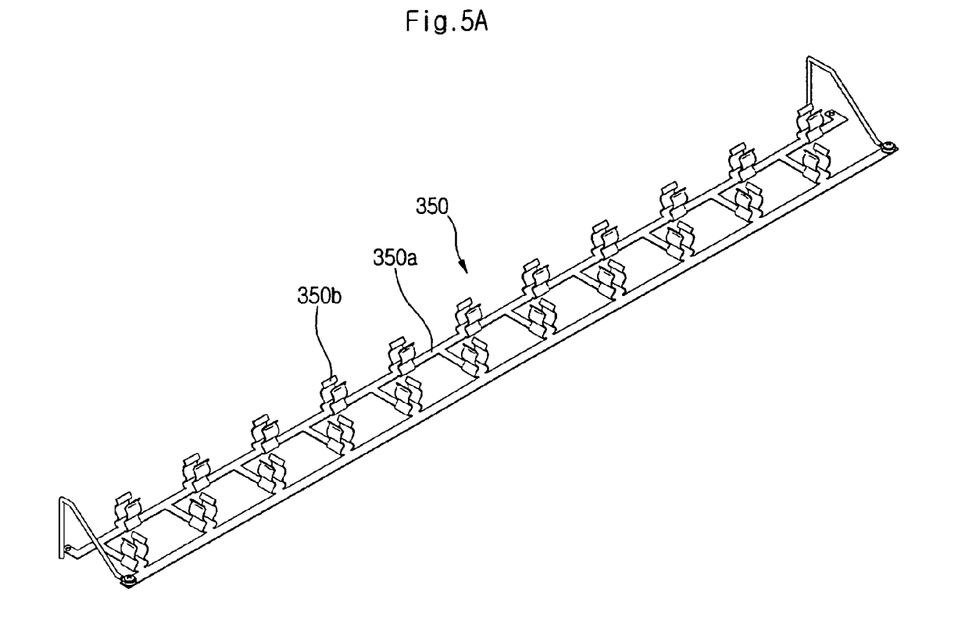
FIGS. 5A and 5B are views illustrating another embodiment of the present invention.
Figure 5B:
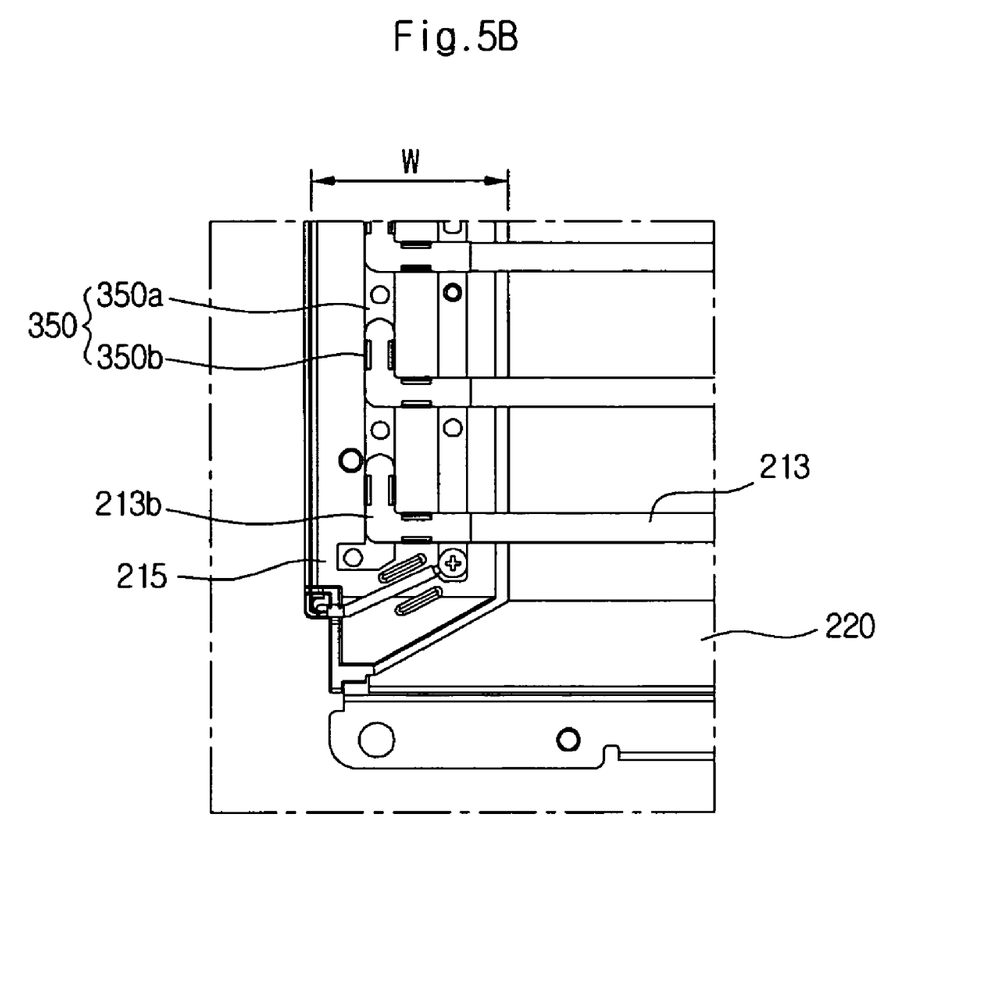

FIGS. 5A and 5B are views illustrating another embodiment of the present invention.

As shown in FIG. 5A, an electrode plate 350 includes a plurality of electrode fixing parts 350b connected with an external electrode of an external electrode fluorescent lamp (EEFL) and a support part 350a for supporting the plurality of electrode fixing parts 350b. The electrode plate 350 is connected with the external electrode of the EEFL, and supplies power to the external electrode of the EEFL.

The electrode plate 350 is connected with an inverter and a wire to receive power from the inverter and the wire. Therefore, the electrode plate 350 is made from a conductive metal plate.

The electrode plate 350 is mounted within a bottom cover of a direct type liquid crystal display using the EEFL. The electrode plate 350 supplies power to the EEFL, and turns the EEFL on/off.

The electrode plate 350 is manufactured through a press process of cutting, punching, bending, and seamlessly drawing a thin conductive metal plate.

The electrode plate 350 is cut in the press process to provide an electrode fixing part 350b which is "⊤"-shaped with respect to a horizontal surface.

In other words, in the electrode plate 350, a support part 350a is reduced in its horizontal width, and one of the electrode fixing parts 350b is located on the support part 350a unlike the conventional art where the electrode fixing part is located between the support parts.

Accordingly, unlike the electrode plate 250 of FIG. 4A which is vertically bent and is reduced in horizontal width, in the inventive electrode plate 350, an interval of the support parts 350a is narrowed to be a half or less than the conventional art.

Unlike the conventional art where the electrode fixing part is provided between the support parts, the electrode fixing part 350b is provided on the support part 350a such that the external electrode of the EEFL can be bent in a horizontal direction and connected with the electrode fixing part 350b.

The horizontal direction refers to the direction parallel to the horizontal surface on which the EEFLs are arranged.

In the electrode plate 350, the electrode fixing part 350*b* is positioned on the support part 350*a*, and one or more can be positioned between the support parts 350*a*.

As shown in FIG. 5B, a lower structure 215 is located on an internal surface of the bottom cover 220, and the electrode plate 350 is disposed on the lower structure 215.

In the electrode plate 350, the electrode fixing part 350*b* is disposed vertically with the support part 350*a*, and the external electrode 213*b* of the EEFLs 213 is bent vertically with respect to the horizontal surface to be connected to the electrode fixing part 350*b*.

Unlike the external electrode 213*b* of FIG. 4B, the external electrode 213*b* of FIG. 5B is bent at 90° in a horizontal direction of the internal surface with respect to the bottom cover 220.

Accordingly, the external electrode 213*b* can be maintained to have an appropriate length as required for the liquid crystal display while the connection width is reduced to a half or less than the conventional art.

Accordingly, the present invention results in the electrode plate 350 and the external electrode 213*b* connected with the electrode fixing part 350*b* being reduced in width, which thereby reduces the widths of an upper structure (not shown) and the lower structure 215 respectively connected to upper and lower portions of the electrode plate 350.

If the upper and lower structures are narrowed to thereby narrow the non-luminous region, the width of a bezel region can be narrowed in assembling the liquid crystal display to thereby provide a narrow bezel type.

As described above, in the direct type liquid crystal display, the external electrode of the EEFL is bent, and the electrode plate connected with the external electrode is modified, thereby extending the luminous region and reducing the width of the bezel.

The present invention has an advantage over the prior art in that the bezel region can be reduced in width, thereby enhancing one's freedom in designing liquid crystal displays.

It will be apparent to those skilled in the art that various modifications and other variations can be made in the present invention. Thus, it is intended that the present invention covers the modifications and variations of this invention provided they come within the scope of the appended claims and their equivalents.

What is claimed is:

1. A backlight assembly comprising:
a plurality of lamps spaced apart from one another, each lamp having two ends and having a bent external electrodes at both ends;
an electrode plate having at least one electrode fixing part to be connected with at least one of the bent external electrodes for supplying power to the external electrode and a support part supporting the electrode fixing part; and
a diffuser unit for diffusing light generated from the plurality of lamps,
wherein the support part is vertically bent,
wherein the electrode fixing part are vertically bent, and
wherein the support part includes two bar type structures which are positioned to be in parallel with each other and slits which are spaced apart from one another between the two bar type structures.

2. The backlight assembly according to claim 1, wherein at least one of the external electrodes is bent at 90° vertically with respect to a horizontal surface on which the lamps are arranged.

3. The backlight assembly according to claim 1, wherein at least one of the external electrodes is bent at 90° in parallel with respect to a horizontal surface on which the lamps are arranged.

4. The backlight assembly according to claim 2, wherein at least one of the electrode fixing parts of the electrode plate is bent at 90° vertically with respect to the horizontal surface, to correspond to at least one of the bent external electrodes.

5. The backlight assembly according to claim 3, wherein at least one of the electrode fixing parts of the electrode plate is bent at 90° in parallel with respect to the horizontal surface, to correspond to at least one of the bent external electrodes.

6. The backlight assembly according to claim 1, wherein the external electrodes and the electrode plate have a bent structure to reduce a non-luminous region.

7. A liquid crystal display comprising:
a liquid crystal panel comprising a color filter substrate coupled to an array substrate, and further comprising a liquid crystal layer;
a plurality of lamps spaced apart from one another to supply light to the liquid crystal panel, wherein each of the plurality of lamps have external electrodes bent at both ends;
an electrode plate having at least one electrode fixing part to be connected with at least one of the bent external electrodes for supplying power to the external electrode and a support part supporting the electrode fixing part; and
a diffuser unit for diffusing light generated from the plurality of lamps,
wherein the support part is vertically bent,
wherein the electrode fixing part are vertically bent, and
wherein the support part includes two bar type structures which are positioned to be in parallel with each other and slits which are spaced apart from one another between the two bar type structures.

8. The display according to claim 7, wherein at least one of the electrode fixing parts is coupled with at least one of the external electrodes.

9. The display according to claim 7, wherein at least one of the electrode fixing parts is bent vertically with respect to a horizontal surface on which the lamps are arranged.

10. The display according to claim 7, wherein at least one of the electrode fixing parts is bent vertically with respect to and along a horizontal surface on which the lamps are arranged.

11. The display according to claim 9, wherein each external electrode is bent to correspond to a bending direction of at least one of the electrode fixing parts.

12. The display according to claim 7, wherein at least one of the plurality of lamps is an EEFL (external electrode fluorescent lamp).

13. The display according to claim 7, wherein the bent external electrodes and the bent electrode plate reduce a non-luminous region at both edges of the lamp.

14. A system for holding lamps used for a liquid crystal display, the system comprising:
a plurality of lamps spaced apart from one another, the lamps having two ends and having external electrodes at each end, the external electrodes having a bend;
an electrode plate;
at least one support part coupled with the electrode plate supplying power to the external electrode;
at least one fixing part coupled with at least one of the support parts;
wherein each of the support parts has a bend that corresponds to the bend in the external electrodes, further wherein each of the fixing parts holds at least one of the external electrodes, at least one of the lamps, or a combination thereof;

wherein the support part is vertically bent, wherein the fixing part are vertically bent, and wherein each of the support parts includes two bar type structures which are positioned to be in parallel with each other and slits which are spaced apart from one another between the two bar type structures.

15. The system according to claim 14, wherein the external electrodes are bent at 90° vertically with respect to a horizontal surface on which the lamps are arranged.

16. The system according to claim 14, wherein the external electrodes are bent at 90° in parallel with respect to a horizontal surface on which the lamps are arranged.

17. The system according to claim 14, wherein at least one of the fixing parts is positioned to hold at least one of the bent external electrodes.

18. The system according to claim 14, wherein at least one of the fixing parts is positioned on at least one support part, wherein the bend in the support part corresponds to the bend in at least one of the external electrodes.

19. The system according to claim 14, wherein at least one of the lamps is an EEFL (external electrode fluorescent lamp).

20. The system according to claim 14, wherein the system and the lamps provide the light source for a liquid crystal display.

* * * * *

UNITED STATES PATENT AND TRADEMARK OFFICE
CERTIFICATE OF CORRECTION

PATENT NO. : 7,633,578 B2  Page 1 of 1
APPLICATION NO. : 11/157026
DATED : December 15, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 506 days.

Signed and Sealed this

Ninth Day of November, 2010

David J. Kappos
*Director of the United States Patent and Trademark Office*